United States Patent [19]
Burke et al.

[11] 3,933,453
[45] Jan. 20, 1976

[54] FLAME HYDROLYSIS MANDREL AND METHOD OF USING

[75] Inventors: Gerald E. Burke, Painted Post; Robert D. DeLuca, Big Flats, both of N.Y.

[73] Assignee: Corning Glass Works, Corning, N.Y.

[22] Filed: May 6, 1974

[21] Appl. No.: 467,017

[52] U.S. Cl............ 65/3; 65/11 W; 65/18; 65/31; 65/89; 65/184; 65/374; 65/DIG. 7; 164/346; 164/400; 242/159; 249/183; 427/167
[51] Int. Cl.² ............... C03C 25/02; C03B 9/32; C03B 19/06;C03C 15/00
[58] Field of Search ....... 242/159, 118.11; 249/183, 249/63; 164/345, 346, 400; 65/4, 11 W, 3, 18, DIG. 7, 31, 374, 2, 89, 184; 427/167

[56] References Cited
UNITED STATES PATENTS

| | | | |
|---|---|---|---|
| 2,171,890 | 9/1939 | Precourt | 242/118.11 |
| 3,486,870 | 12/1969 | Vervaart et al. | 65/18 X |
| 3,737,292 | 6/1973 | Keck et al. | 65/4 X |
| 3,741,796 | 6/1973 | Walker | 65/18 X |

FOREIGN PATENTS OR APPLICATIONS

| | | | |
|---|---|---|---|
| 11,140 | 6/1891 | United Kingdom | 249/183 |

*Primary Examiner*—Robert L. Lindsay, Jr.
*Attorney, Agent, or Firm*—William J. Simmons, Jr.; Walter S. Zebrowski; Clarence R. Patty, Jr.

[57] ABSTRACT

There is disclosed a method and apparatus for providing optically pure glass blanks, tubing, crucibles and the like for use in forming optical waveguides, lenses, prisms, filters, lamp envelopes and the like. A glass layer is formed at a high temperature on a mandrel which includes a support rod or tube upon which is disposed a layer of refractory metal wire, gauze, foil or the like. The mandrel is so constructed that stresses, which heretofore have developed in the glass layer during cooling, are avoided, and the mandrel is easily removed from the glass layer, thereby forming a hollow glass cylinder that is free from cracks, checks and the like.

17 Claims, 8 Drawing Figures

FLAME HYDROLYSIS MANDREL AND METHOD OF USING

BACKGROUND OF THE INVENTION

This invention relates to a method and apparatus for producing high optical quality glass articles, and more particularly, it relates to an improved mandrel for use in such glass deposition processes as the flame hydrolysis process and to a method of using this mandrel.

The production of high quality, high purity vitreous materials has always been important in optics since optical systems have required low loss, distortion free components. It has recently been found that fused silica and similar high purity glasses formed by the flame hydrolysis process can be used to advantage in the production of low attenuation optical waveguides which heretofore have not been satisfactorily formed by other glass forming techniques. In addition, because of this, high quality, flame hydrolysis-produced glasses, such as fused silica, are finding greater application in the formation of lenses, prisms and the like. Although the present invention is useful for forming various optical devices by the process of building up a layer of glass on a rotating mandrel, it will be specifically described in connection with the formation of optical waveguides by the flame hydrolysis process.

The flame hydrolysis technique has recently been employed to prepare single mode waveguides and multimode waveguides of both the step-index and graded-index type. A method of forming step-index waveguides is taught in U.S. Pat. No. 3,737,292 issued June 5, 1973, to D. B. Keck et al., and a method of forming graded-index waveguides is disclosed in U.S. Pat. application Ser. No. 239,496 filed by P. C. Schultz on Mar. 30, 1972, entitled "Method of Forming a Light Focusing Fiber Waveguide" now U.S. Pat. No. 3,826,560. The flame hydrolysis process basically consists of introducing the vapor of a hydrolyzable compound into a flame to form a glass soot which is directed toward a rotating mandrel to form a coating thereon which is referred to as a soot preform. The soot preform must be subjected to a temperature within the consolidation temperature range for a time sufficient to permit the soot particles to fuse and consolidate, thereby forming a dense glass which is free from particle boundaries. The mandrel is usually employed to support the soot preform in the consolidation furnace, but it must be removed prior to drawing the consolidated soot preform into a fiber. However, the consolidation process causes the consolidated glass to bond tightly to the mandrel. Even a slight expansion mismatch between the mandrel material and that of the consolidated glass can cause large stresses to exist in the consolidated glass after it has cooled, and such stresses can cause the consolidated dense glass to crack during removal of the mandrel. Stress can be relieved by annealing the consolidated preform-mandrel composite prior to removing the mandrel, but this increases the processing time and thus increases the cost of manufacturing optical waveguides.

An apparent solution to the expansion mismatch problem is to use a mandrel of the same material as that which is being deposited by flame hydrolysis. However, optical waveguides include core and cladding materials which have different expansion characteristics, and there is necessarily an expansion mismatch between the consolidated optical waveguide preform and the mandrel. Moreover, many optical waveguide materials, such as fused silica and doped fused silica cannot be melted and formed into suitable mandrels by conventional glass forming techniques. Therefore, mandrels for use in the formation of articles of such glasses have been made from graphite, glass ceramic, quartz, and crystalline material such as alumina, mullite and the like, which have expansion coefficients different from both the core and cladding materials.

The process of removing the mandrel from the consolidated optical waveguide preform is difficult and time consuming. Although the mandrel can be removed by grinding or drilling, it is usually removed by pumping an etchant through a hollow mandrel until the mandrel is completely dissolved. The process of manufacturing optical waveguides could be made faster and simpler by improving the mandrel removing process.

SUMMARY OF THE INVENTION

It is therefore an object of the present invention to provide an improved mandrel for use in the formation of glass articles by the process of forming a dense glass layer on a mandrel and thereafter removing the mandrel. Another object is to provide a mandrel that is easily removed from a dense glass cylinder that has been formed thereon at high temperatures. Still another object is to provide a mandrel which prevents the formation of large stresses in a dense glass layer formed thereon during the cooling of the mandrel-glass composite. Another object is to provide an improved method of making high optical quality glass articles such as optical waveguides.

Briefly, the present invention relates to a method and apparatus for forming a glass article. The apparatus generally comprises a cylindrically shaped mandrel and means for forming a glass coating on the surface of the mandrel. In accordance with the present invention, the mandrel is characterized in that it comprises a cylindrical support and tubular means slidably mounted on the surface of the support, the outer surface of the tubular means being formed of refractory metal.

The aforementioned mandrel is utilized in the formation of a glass article by forming a dense glass layer on the surface of the tubular means, removing the cylindrical support from the tubular means, and thereafter removing the tubular means from the inner surface of the dense glass layer, thereby forming a hollow cylindrical dense glass structure.

DESCRIPTION OF THE PREFERRED EMBODIMENTS

It is to be noted that the drawings are illustrative and symbolic of the present invention, and there is no intention to indicate the scale or relative proportions of the elements shown therein. For the purpose of simplicity, the present invention will be substantially described in connection with an apparatus and method for forming a glass optical waveguide although this invention is not intended to be limited thereto.

Figure 1:
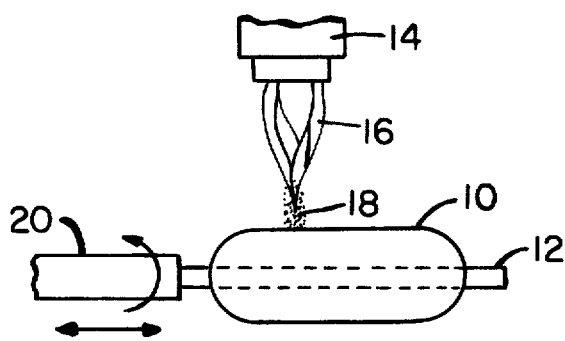
FIGS. 1 and 2 illustrate the application of first and second coatings of glass soot to a mandrel.

Referring to FIG. 1, a coating 10 of glass soot is applied to cylindrical mandrel 12 by means of flame hydrolysis burner 14. Fuel gas and oxygen or air are supplied to burner 14 from a source (not shown). This mixture is burned to produce flame 16 which is emitted from the burner. A gas-vapor mixture is hydrolyzed within flame 16 to form a glass soot that leaves the flame in a stream 18, which is directed toward mandrel 12. The flame hydrolysis method of forming soot coatings on cylindrical mandrels is described in greater detail in the aforementioned U.S. Pat. No. 3,737,292 and the aforementioned Schultz application. Mandrel 12 is supported by means of support portion 20 and is rotated and translated as indicated by arrows adjacent thereto in FIG. 1 for uniform deposition of soot.

Figure 2:
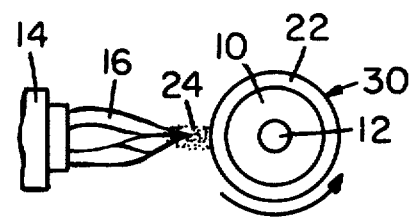

To form a step-index optical waveguide, a second coating 22 of glass soot may be applied over the outside peripheral surface of first coating 10 as shown in FIG. 2. In accordance with well known practice the refractive index of coating 22 is made lower than that of coating 10 by changing the composition of the soot 24 being produced in flame 16. This can be accomplished by changing the concentration or type of dopant material being introduced into the flame, or by omitting the dopant material. Mandrel 12 is again rotated and translated to provide a uniform deposition of coating 22, the composite structure including first coating 10 and second coating 22 constituting an optical waveguide soot preform 30.

To form a graded-index optical waveguide, there is deposited on mandrel 12 a coating of soot having a radially varying composition by means of flame hydrolysis.

In the manufacture of optical waveguides, the materials of the core and cladding of the waveguide should be produced from a glass having minimum light attenuation characteristics, and although any optical quality glass may be used, fused silica is a particularly suitable glass. For structural and other practical considerations, it is desirable for the core and cladding glasses to have similar physical characteristics. Since the core glass must have a higher index of refraction than the cladding for proper operation, the core glass may desirably be formed of the same type of glass used for the cladding and doped with a small amount of some other material to slightly increase the refractive index thereof. For example, if pure fused silica is used as the cladding glass, the core glass can consist of fused silica doped with a material to increase its refractive index.

There are many suitable materials that can satisfactorily be used as a dopant alone or in combination with each other. These include, but are not limited to, titanium oxide, tantalum oxide, tin oxide, niobium oxide, zirconium oxide, aluminum oxide, lanthanum oxide and germanium oxide. Optical waveguides can also be made by forming the core from one or more of the aforementioned dopant oxides, the cladding being made from one or more materials having a lower refractive index. For example, a core made of pure germanium oxide may be surrounded by a cladding layer of silica doped germanium oxide.

After a soot preform of the desired dimensions has been formed on the mandrel, the mandrel-preform composite is inserted into a furnace wherein the soot is subjected to a temperature within the consolidation temperature range thereof. The particles of soot fuse and consolidate to form a dense glass body free from particle boundaries. The consolidation temperature depends upon the composition of the glass soot. For example, the consolidation temperature is in the range of about 1250° to 1700°C for high silica content soot, consolidation at 1250°C requiring a very long time. The preferred consolidation temperature for high silica content soot is between 1400°C and 1500°C. The consolidation temperatures for soot of other compositions is lower than that for silica, high germania content soot being easily consolidated at about 900°C. Moreover, if the surface upon which the glass is being deposited is maintained at a sufficiently high temperature, a layer of consolidated dense glass can be directly deposited on the mandrel by flame hydrolysis. This can be accomplished by the use of auxiliary heating means and/or increasing the temperature of the flame in which the vapor is hydrolyzed. Glass consisting of germania and up to 25% silica has been deposited in this manner directly upon a mandrel. Another method of forming a glass layer on a mandrel is disclosed in U.S. Pat. No. 2,904,713 issued Sept. 15, 1959. In accordance with the teachings of that patent, glass powder is dropped onto the surface of a mandrel that is disposed in a furnace.

After the dense glass layer has been formed on the surface of the mandrel, either by direct deposition of glass or by consolidation of soot, the mandrel is removed. The resulting hollow, dense glass structure is then heated to a temperature sufficiently high to cause the viscosity thereof to become low enough for drawing. For example, a high silica content structure can be drawn at about 2000°C. As the structure is drawn, it decreases in diameter until the central hole collapses. Drawing is continued until the final desired waveguide dimensions are obtained.

In accordance with the present invention, the mandrel comprises a tubular member that is slidably or releasably mounted on a cylindrical support. The tubular member functions as a release agent in that the cylindrical support can be readily removed therefrom. Moreover, the tubular member is so constructed that it can be relatively easily removed from the glass layer or article formed thereon. The tubular member may also compress to avoid the buildup of stress in the glass layer that has been formed thereon. The cylindrical support may be in the form of a rod or tube and may be formed of any material having adequate strength and high temperature properties such as metal, glass, ceramic or the like. Depending upon the construction of the tubular member, it may be necessary to construct the cylindrical support from a material having a coefficient of expansion that is greater than that of the glass layer which is to be formed on the mandrel. At least the outer surface of the tubular member consists of a refractory metal such as platinum, tantalum, niobium, tungsten, rhenium, iridium, stainless steel, or the like. The particular metal to be employed depends in part upon the highest temperature to which the mandrel will be subjected. Depending upon the thermal coefficients of expansion of the cylindrical support and the glass being deposited, the tubular member may also include a layer of resilient or compressive material disposed between the metallic outer surface and the cylindrical support.

The embodiments hereinafter described illustrate some of the forms which the metallic outer surface may take. The compressive layer may be employed with any of these embodiments although it is specifically illustrated and described in connection with only one of them. If the glass layer is directly deposited on the mandrel, rather than depositing and consolidating a soot coating, the metallic outer surface should be free from openings into which the molten glass can flow as it is being deposited. However, if the glass layer is formed by depositing a coating of soot on the mandrel and thereafter consolidating the soot, the metallic outer surface can be porous, but the openings should be small enough that the soot particles do not pass therethrough. The usual diameter of the soot particles is about 0.1 $\mu$m, but particles as small as 0.05 $\mu$m in diameter have been formed. A porous metallic outer surface is advantageous in that an etchant can be caused to flow through the pores or openings therein to thereby remove at least a portion of the inner surface of the adjacent glass layer and facilitate the removal of the metallic outer surface of the mandrel from the glass layer.

Figure 3:
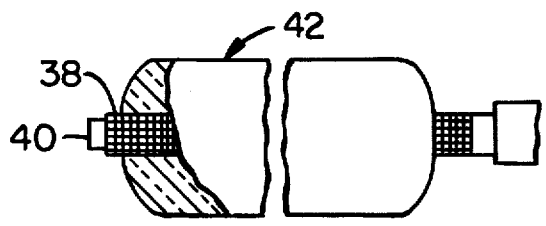
FIG. 3 illustrates, in partial cross-section, a reusable mandrel constructed in accordance with the present invention.

FIG. 3 illustrates a reusable mandrel consisting of a layer 38 of metallic gauze disposed around support member 40. This embodiment may be constructed by wrapping a piece of metallic gauze around the support member to form at least one layer thereof and welding or otherwise bonding the edges to form a continuous tube or cylinder. A gauze tube could also be formed separately from support member 40 and slipped onto that member. The mesh size of the gauze is chosen to be small enough that the particles of soot deposited during the flame hydrolysis process do not penetrate the gauze and adhere to support member 40.

After soot preform 42 is deposited upon the surface of the mandrel, the mandrel is used as a support for the soot preform while it is consolidated into a dense glass layer. During the consolidation process, the viscosity of the glass soot remains sufficiently high to prevent the soot from flowing through openings of gauze 38. After the soot is consolidated, support member 40 can therefore be relatively easily removed, thereby leaving the composite structure illustrated in FIG. 4, which comprises a hollow cylinder 44 of consolidated glass having metallic gauze 38 adhering to the inner surface thereof. As illustrated by arrows 46 acid may be pumped through glass cylinder 44 where it passes through mesh 38 and attacks that portion of the glass adhering to the mesh. An acid such as HF, HCl or the like is chosen which attacks the glass but not the metallic gauze. After a sufficient amount of glass has been removed, the metallic gauze may be removed intact so that it may be reused.

Figures 4, 5:
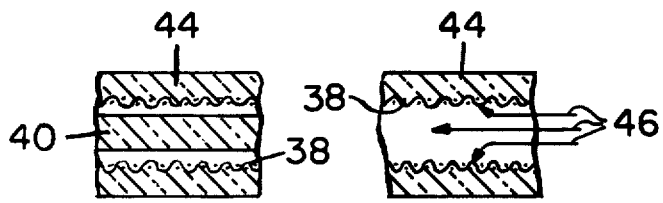
FIGS. 4 and 5 illustrate steps in the removal of the mandrel of FIG. 3 from a consolidated dense glass cylinder.
Figure 7:
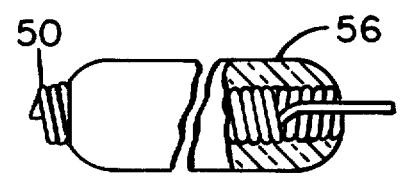
FIG. 7 illustrates the process of removing the mandrel coil from a consolidated glass cylinder.

If the expansion coefficient of support member 40 is greater than that of the glass cylinder 44, member 40 will shrink away from gauze 38 as it cools after the process of consolidation as illustrated in FIG. 5. If the coefficients of expansion of the materials employed are such that glass cylinder 44 tends to shrink onto gauze 38 upon cooling, the resiliency of the gauze may prevent the buildup of stress which would otherwise tend to occur due to expansion mismatch. If the expansion coefficient of glass cylinder 44 is much greater than that of support member 40, a layer of resilient material may have to be employed between gauze 38 and support member 40.

Figure 6:
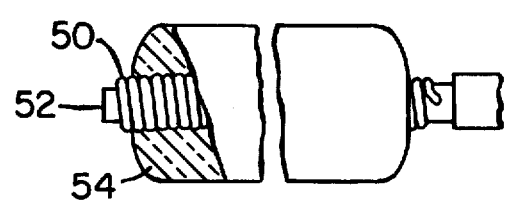
FIG. 6 illustrates, in partial cross-section, a mandrel having a refractory wire coil surface.

In the embodiment illustrated in FIG. 6, the mandrel comprises a coil of metallic wire 50 tightly wound around support member 52. After soot preform 54 is deposited upon the surface of coil 50 the mandrel is utilized to support the preform during the consolidation thereof. The mandrel of this embodiment should only be employed if the expansion coefficient of support member 52 is equal to or greater than that of the consolidated glass, since coil 50 cannot be compressed onto support member 52. However, if a coil of very fine wire were disposed upon a support member having a layer of resilient material on the surface thereof, a high expansion glass could be deposited. As such glass shrinks upon cooling, the fine wire coil deforms and compresses the resilient layer.

Figure 8:
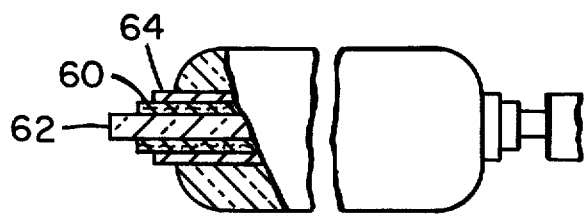
FIG. 8 illustrates, in partial cross-section, another embodiment of the present invention wherein the mandrel includes a refractory metal foil surface.

After the consolidation process, support member 52 is removed leaving a hollow cylinder 56 of consolidated glass having coil 50 adhering to the inner surface thereof. Since coil 50 is tightly wound, soot particles cannot pass therethrough during the soot deposition process. Moreover, as explained in connection with the embodiment of FIG. 3, glass does not flow through the adjacent turns of coil 50 during the consolidation process. In this embodiment, acid is therefore not usually required to weaken the bond between the glass and metallic layer, and coil 50 can be unwound from the inner surface of the glass as shown in FIG. 8. If any difficulty is encountered during the removal of coil 50, an etching solution can be applied to the inner surface of coil 50 where it will flow between adjacent coil turns and attack the glass to facilitate removal of the wire.

FIG. 8 illustrates an embodiment wherein a layer of compressible material is disposed between the metallic layer and the support member. In this embodiment, a layer 60 of fibrous refractory material such as alumina silicate, zirconia, alumina or the like is disposed upon the surface of support member 62. Sheets of fibrous alumina silicate suitable for use as layer 60 are commercially sold under the trademark Fiberfrax paper. Layer 60 may be applied by wrapping a sheet of such fibrous material around support member 62. Layer 60 could also be formed by brushing onto the surface of support member 62 a suspension of refractory fibers or powder in a volatile vehicle to form a layer of non-compacted fibers or powder after the vehicle evaporates. A layer 64 of metallic foil may be wrapped around layer 60 or may be initially formed into a cylinder and then slipped over support member 62 and compressive layer 60. The maximum thickness of the foil is one tenth the outside diameter of the consolidated glass cylinder.

A soot preform is deposited upon the metallic foil and thereafter consolidated. After support member 62 and compressive layer 60 are removed from the interior of the consolidated glass cylinder, the foil layer 64 can also be removed. During the removal operation, the foil cylinder becomes distorted to such an extent that it cannot be reused. However, if a valuable metal such as platinum is employed, the metal is easily reclaimed. As described in connection with the previous embodiments, the foil may be disposed directly upon the surface of support member 62 if the expansion coefficient of support member 62 is greater than that of the consolidated glass layer.

Since the metallic foil layer 64 presents a continuous, non-porous surface, a mandrel employing this layer may be used for the direct deposition of a glass layer by the flame hydrolysis or similar process. When used in this manner, the foil must be of a material which can withstand extremely high temperatures since the flame temperature is high enough to deposit a layer of glass rather than a layer of soot as previously described. A mandrel employing a metallic mesh or coil cannot be used in the process of directly depositing a layer of glass since the molten glass is capable of flowing between adjacent turns of a coil or fibers of the gauze where they both adhere to the support member and become embedded throughout the metallic layer.

Following are examples of methods of producing multimode waveguides in accordance with the present invention.

A cylindrical mandrel is formed by winding a 0.04 inch diameter platinum wire in a very close pitch around a 0.25 inch diameter alumina rod. Liquid $SiCl_4$ maintained at a temperature of 32°C is provided in a first container and liquid $GeCl_4$ maintained at a temperature of 35°C is provided in a second container. Dry oxygen is bubbled through both liquids so that vapors of each are picked up by the oxygen. The oxygen is bubbled through the liquid $SiCl_4$ at the rate of 2000 cc per minute and through the $GeCl_4$ at the rate of 380 cc per minute. The resultant vapors entrained within the oxygen are combined and passed through a gas-oxygen flame where the vapors hydrolyze to form a steady stream of soot having a composition of 25% by weight $GeO_2$ and 75% by weight $SiO_2$. The soot is directed toward the rotating mandrel which is translated with respect to the flame so that a uniform coating of soot is deposited on the platinum coil portion of the mandrel to form a soot preform. This process is continued until the preform is about 1.5 inches in diameter. The flow of oxygen to the liquid $GeCl_4$ is terminated and a second coating of 100% $SiO_2$ soot is deposited upon the first layer until the diameter of the resultant preform is about 2.4 inches. The soot preform-mandrel composite is inserted into a globar furnace having a temperature of about 1500°C, thereby fusing the soot particles and forming a consolidated glass layer free from particle boundaries. Upon removal from the induction furnace the alumina rod shrinks away from the platinum coil while cooling. The alumina rod is removed from the hollow glass cylinder leaving the platinum coil adhering to the inner surface thereof. Hydrofluoric acid is pumped through the platinum coil. Some of the acid penetrates between adjacent turns of the coil and weakens the bond between the coil and the glass. The platinum wire is then pulled and uncoiled from the interior of the glass cylinder. The tubular member so formed is rinsed in 50% hydrofluoric acid solution, flame polished and again washed in said acid solution to provide a clean tubular member having an outside diameter of about 1.1 inches. This structure is then placed in an induction furnace and is drawn in an oxygen atmosphere at about 2000°C. As the structure is drawn, it decreases in diameter and the central hole collapses. Drawing is continued until the final waveguide dimensions of about 5 mils outside diameter are obtained.

In the following example a glass layer is directly deposited on a mandrel, thereby eliminating the consolidation step. A sheet of 1 mil thick platinum foil 5 inches long and about 1 inch wide is wrapped around a 5/16-inch diameter cylinder and welded to form a tube having a 5/16-inch inner diameter. A sheet of 1/32-inch thick fibrous alumina silicate about 12 inches long is coiled around a ¼-inch diameter alumina tube to form a cylinder having an axial length of about 6 inches, and the platinum foil cylinder is inserted thereover. Liquid $SiCl_4$ maintained at a temperature of 23°C is provided in a first container and liquid $GeCl_4$ maintained at a temperature of 31°C is provided in a second container. Helium is bubbled through the second container at a rate of 1200 cc per minute and the resultant mixture containing helium and entrained vapors is passed through a gas-oxygen flame which is directed toward the platinum foil surface of the rotating mandrel. The gas-oxygen mixture is adjusted so that the temperature at the mandrel is about 900°C. The flame is translated with respect to the mandrel and a layer of 100% $GeO_2$ glass is deposited on the mandrel until a glass cylinder having a diameter of 7/8-inch is formed. Dry oxygen is then bubbled through the first container at the rate of 100 cc per minute and the resultant mixture of oxygen and vapors entrained therewith is combined with the mixture from the second container. This mixture of oxygen, helium and vapors of $GeCl_4$ and $SiCl_4$ is hydrolyzed within the flame hydrolysis burner to provide upon the surface of the $GeO_2$ cylinder a cladding layer having a composition of 90% by weight $GeO_2$ and 10% by weight $SiO_2$. This cladding layer is deposited until a glass cylinder having a diameter of 1 inch is formed. Since the redraw blank thus formed has a very high germania content, its thermal coefficient of expansion is much greater than that of the alumina tube and it tends to shrink onto the platinum foil tube after the flame hydrolysis burner is extinguished. However, the sheet of fibrous alumina silicate compresses and the platinum foil tube deforms, thereby preventing the formation of large stress within the cylindrical glass redraw blank. The presence of the fibrous alumina silicate sheet enables the removal of the alumina tube from the structure. The fibrous alumina silicate sheet is then removed. The resultant hollow glass redraw blank is placed in an annealing furnace at a temperature of 650°C. After the redraw blank has been annealed for 60 minutes, the platinum foil is grasped by a pair of tweezers and removed from the inner surface of the hollow glass cylinder. After removal from the annealing furnace, the tubular member so formed is acid rinsed, flame polished and drawn into a fiber in accordance with the previous example.

We claim:
1. In an apparatus for forming a hollow cylindrical glass article comprising
   a cylindrically shaped mandrel, and
   means for forming a glass coating on the surface of said mandrel,
   said mandrel being characterized in that it comprises
   a cylindrical support, and
   tubular means slidably mounted on the surface of said support, the outer surface of said tubular means being formed of refractory metal.
2. An apparatus in accordance with claim 1 wherein said tubular means comprises an inner layer of compressible material disposed on said support, said refractory metal outer surface being disposed on the outer surface of said compressible layer.
3. An apparatus in accordance with claim 2 wherein said compressible layer comprises a layer of refractory fibers.

4. An apparatus in accordance with claim 3 wherein said outer surface of said tubular means comprises a tube of metallic foil.

5. An apparatus in accordance with claim 3 wherein said outer surface of said tubular means comprises a tightly wound coil of metallic wire.

6. An apparatus in accordance with claim 3 wherein said outer surface of said tubular means comprises a layer of metallic gauze.

7. An apparatus in accordance with claim 1 wherein the thermal coefficient of expansion of said cylindrical support is greater than that of said hollow cylindrical glass article to be formed thereon and wherein said tubular means comprises a tube of metallic foil.

8. An apparatus in accordance with claim 1 wherein the thermal coefficient of expansion of said cylindrical support is greater than that of said hollow cylindrical glass article to be formed thereon and wherein said tubular means comprises a coil of metallic wire tightly wound on said cylindrical support so that adjacent turns of said coil are in contact.

9. An apparatus in accordance with claim 1 wherein said tubular means comprises a layer of metallic gauze.

10. A method of forming an article of glass having a predetermined thermal coefficient of expansion comprising the steps of
    providing a mandrel having a tubular member slidably mounted on a cylindrical support, said tubular member having a refractory metal outer surface,
    forming at an elevated temperature a dense glass layer on said refractory metal surface,
    removing said cylindrical support from said tubular member, and
    removing said tubular member from the inner surface of said dense glass layer, thereby resulting in a hollow cylindrical dense glass structure.

11. A method in accordance with claim 10 further comprising the steps of
    heating said hollow, cylindrical dense glass structure to the drawing temperature of the materials thereof, and
    drawing the heated structure to reduce the cross-sectional area thereof and to collapse the hole therein and to form a fiber having a solid cross-section.

12. A method in accordance with claim 10 wherein the thermal coefficient of expansion of said cylindrical support is less than said predetermined thermal coefficient of expansion, wherein said tubular member comprises a compressible layer surrounded by a tube of metallic foil, and wherein the step of removing said tubular member comprises removing said compressible layer and thereafter mechanically removing said metallic foil from the inner surface of said dense glass structure.

13. A method in accordance with claim 10 wherein the step of forming a dense glass layer comprises the steps of
    depositing on said tubular member a coating of flame hydrolysis-produced glass soot to form a soot preform, and
    heating said soot preform to a temperature within the consolidation temperature range for a time sufficient to cause said soot particles to fuse and form said dense glass layer.

14. A method in accordance with claim 13 wherein the thermal coefficient of expansion of said cylindrical support is greater than said given thermal coefficient of expansion, wherein said tubular member comprises a coil of wire tightly wound around said cylindrical support, and wherein the step of removing said tubular member comprises unwinding said coil of wire from the inner surface of said dense glass structure after said cylindrical support has been removed.

15. A method in accordance with claim 13 wherein the thermal coefficient of expansion of said cylindrical support is greater than said given thermal coefficient of expansion, wherein said tubular member comprises a layer of metallic gauze, and wherein the step of removing said tubular member comprises applying an etchant solution to the inner surface of said layer of gauze after said cylindrical support has been removed, said etchant solution flowing between the fibers of said gauze and attacking the inner surface of said dense glass structure adjacent to said gauze, and thereafter mechanically removing said gauze from the inner surface of said dense glass structure.

16. A method in accordance with claim 13 wherein the step of depositing said glass soot includes the step of varying the composition of said soot during the deposition thereof so that the refractive index of that portion of said soot coating which is disposed on said tubular member is greater than that of the outer surface of said soot coating.

17. A method in accordance with claim 16 further comprising the steps of
    heating said hollow cylindrical dense glass structure to the drawing temperature of the materials thereof, and
    drawing the heated structure to reduce the cross-sectional area thereof and to collapse the hole therein and to form a fiber having a solid cross-section.

* * * * *